(No Model.)

J. H. NICHOLSON.
SLED.

No. 366,239. Patented July 12, 1887.

WITNESSES:
George Birkenburg
C. Sedgwick

INVENTOR:
J. H. Nicholson
BY
ATTORNEYS.

UNITED STATES PATENT OFFICE.

JACOB HARRY NICHOLSON, OF OXFORD, MARYLAND.

SLED.

SPECIFICATION forming part of Letters Patent No. 366,239, dated July 12, 1887.

Application filed November 24, 1886. Serial No. 219,762. (No model.)

*To all whom it may concern:*

Be it known that I, JACOB HARRY NICHOLSON, of Oxford, in the county of Talbot and State of Maryland, have invented a new and Improved Sled, of which the following is a full, clear, and exact description.

This invention relates to a novel form of sled wherein the rear portion of the seat is adjustable, being so connected and arranged that it may be adjusted so as to occupy a plane parallel with but above that occupied by the forward portion of the seat, or be adjusted so as to constitute a back, in which latter case it is moved so that it will extend upward at an angle from the forward portion of the seat; or the two sections of the seat may be adjusted so as to occupy the same plane.

Reference is to be had to the accompanying drawings, forming a part of this specification, in which similar figures of reference indicate corresponding parts in all the views.

Figure 1:
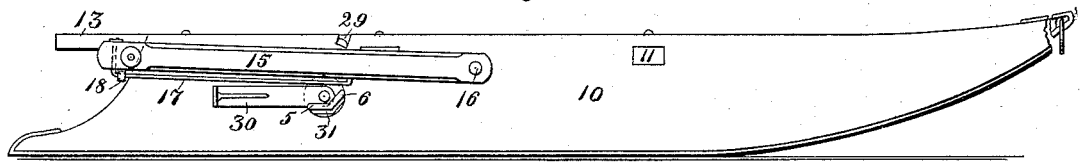
Figure 2:
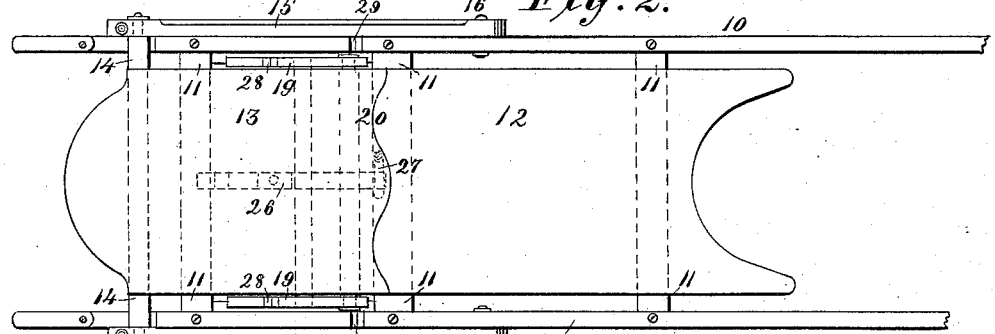
Figure 3:
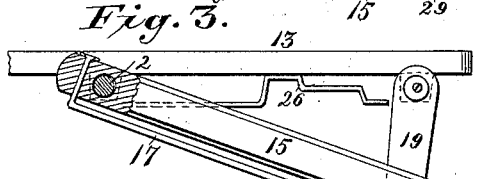
Figure 4:
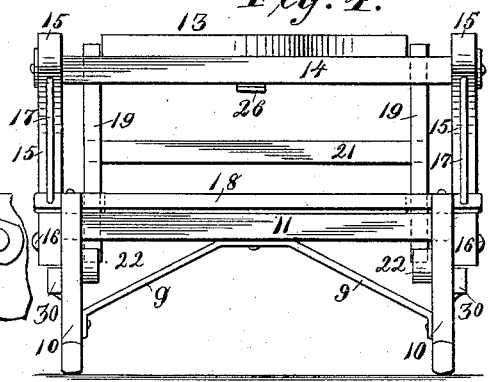
Figure 5:
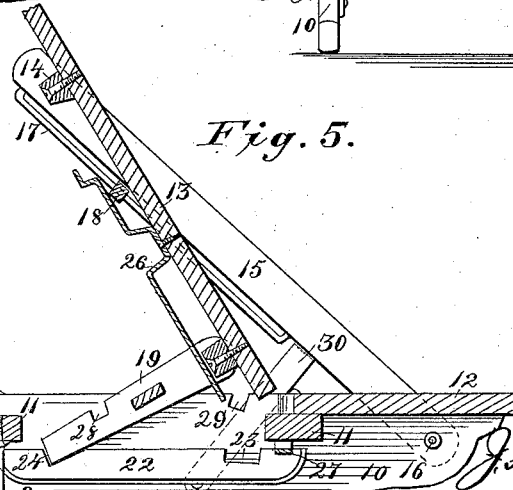

Figure 1 is a side view of my improved form of sled. Fig. 2 is a plan view of the same. Fig. 3 is an enlarged detailed view of the rear portion of the sled, the upper end of the diagonal side brace being shown in section. Fig. 4 is a rear view of the sled when the parts are adjusted as represented in Fig. 3; and Fig. 5 is a central sectional view of the rear portion of the sled when adjusted so that the rear section of the seat constitutes a back for the forward portion thereof.

In constructing such a sled as the one forming the subject-matter of this application, I provide runners 10 of ordinary form, that are connected by cross-bars 11 and strengthened by braces 9, the seat 20 being carried by the cross-bars, said seat, however, being made in two sections, 12 and 13, of which the forward section, 12, is permanently connected to the two forward cross-bars. The rear section, 13, of the seat 20 is rigidly connected to a cross-bar, 14, that is formed with round ends 2, which said ends fit in correspondingly-formed apertures, that are made in diagonal braces 15, the forward ends of said braces being pivotally connected to the runners 10 by bolts 16.

Each of the braces 15 carries a metallic rod, 17, upon which there is mounted a cross-bar, 18, the rod 17 passing through apertures formed near the ends of the bar 18. Two legs or braces, 19, are connected to the sides of the section 13 at points near the forward end of said section, said legs in turn being connected and braced by a cross-bar, 21.

To the inner faces of the runners 10, I secure cleats 22, which said cleats are formed with forward recesses or notches, 23, and rear recesses or notches, 24.

To the bottom of the section 13 there is connected a locking-bar, 26, which, when the parts are in the position in which they are shown in Fig. 1, extends forward and beneath the central cross-bar, 11, and also beneath the rear cross-bar, the forward end of the locking-bar being held by a spring-catch, 27, which spring-catch is best shown in Fig. 5.

When it is desired to raise the section 13 so that it will occupy a position above the main and forward portion of the seat, the locking-bar 26 is freed from engagement with the cross-bars 11, and the section 13 is raised, swinging at this time upon its connection with the diagonal braces 15, the bar 18 is slid down and into notches 28, that are formed in the legs 19, and adjusted so as to fit within other notches, 29, that are formed in the runners 10, the feet of the legs 19 at this time resting within the recesses 23 of the cleats 22, this position of the parts being clearly illustrated in Figs. 3 and 4. In adjusting the sled so that the section 13 shall constitute a back for the party sitting on section 12, the bar 18 is slid back upon the rod 17, and the feet of the legs 19 are adjusted so as to rest within the recesses 24 of the cleats 22, after which locking-arms 30, that are pivotally connected to sockets 31, which sockets are secured to the outer faces of the runners 10, are turned up so that they bear against the under sides of the diagonal braces 15, thus affording a firm support for said braces.

When the locking-arms 30 are not in use, they are returned to the position in which they are shown in Figs. 1 and 3, being held by the horizontal flange 5 of the socket 31, their upper position being defined by a diagonal flange, 6, that is also formed upon the socket.

It will be readily understood that by the use of the connections described the rear section of the seat will be firmly locked in either of the three positions to which it may be adjusted, and the advantages arising from the adaptability of the sled to the several positions in which the parts are shown will be readily appreciated.

Having thus fully described my invention, I claim as new and desire to secure by Letters Patent—

1. In a sled, the combination, with the runners and a permanently-mounted forward seat-section, of diagonal braces pivotally connected to the runners, a rear seat-section pivotally connected to the diagonal braces, rods 17, carried by the braces, a bar, 18, mounted upon the rods 17, feet 19, pivotally connected to the rear section of the seat and formed with recesses 28, and cleats 22, formed with recesses 23, the runners of the sled being formed with recesses adapted to receive the bar 18, substantially as described.

2. In a sled, the combination, with the main frame of the sled, of a forward permanently-mounted seat-section, a rear seat-section pivotally connected to diagonal braces, that are in turn pivotally connected to the main frame of the sled, cleats 22, formed with recesses 24, and locking-arms 30, substantially as described.

3. In a sled, the combination, with a main frame, of a forward permanently-mounted seat-section, a rear seat-section, that is pivotally connected to diagonal bracing-arms, which are in turn pivotally connected to the main frame of the sled, and a locking device, substantially as described, whereby the rear seat-section may be locked in position so that it will occupy the same plane as that occupied by the forward seat-section, substantially as described.

JACOB HARRY NICHOLSON.

Witnesses:
   MAURICE S. BENSON,
   HERBERT N. BEALL.